United States Patent
Knorr et al.

(10) Patent No.: US 8,604,360 B2
(45) Date of Patent: Dec. 10, 2013

(54) SEALING BODY FOR A CABLE SLEEVE

(75) Inventors: Jens Knorr, Werdohl (DE); Andreas M. Eichstädt, Hemer (DE); Thorsten Müller, Hemer (DE)

(73) Assignee: CCS Technology, Inc., Wilmington, DE (US)

( * ) Notice: Subject to any disclaimer, the term of this patent is extended or adjusted under 35 U.S.C. 154(b) by 908 days.

(21) Appl. No.: 12/249,112

(22) Filed: Oct. 10, 2008

(65) Prior Publication Data

US 2009/0309313 A1    Dec. 17, 2009

Related U.S. Application Data

(63) Continuation of application No. PCT/EP2007/001840, filed on Mar. 3, 2007.

(30) Foreign Application Priority Data

Apr. 11, 2006   (DE) ...................... 20 2006 006 019 U

(51) Int. Cl.
*H01L 23/02*        (2006.01)

(52) U.S. Cl.
USPC ........................... 174/564; 174/656; 277/603

(58) Field of Classification Search
USPC ................... 277/603, 607; 174/564, 656
See application file for complete search history.

(56) References Cited

U.S. PATENT DOCUMENTS

| | | | |
|---|---|---|---|
| 3,564,113 A * | 2/1971 | Kindler | 174/656 |
| 4,117,259 A * | 9/1978 | Giebel et al. | 174/92 |
| 4,818,310 A | 4/1989 | McNeal | 156/48 |
| 4,942,270 A * | 7/1990 | Gamarra | 174/93 |
| 4,963,698 A * | 10/1990 | Chang et al. | 174/77 R |
| 5,007,701 A * | 4/1991 | Roberts | 385/53 |
| 5,313,019 A * | 5/1994 | Brusselmans et al. | 174/93 |
| 5,426,715 A * | 6/1995 | Moisson et al. | 385/76 |
| 5,446,823 A * | 8/1995 | Bingham et al. | 385/135 |
| 5,479,554 A * | 12/1995 | Roberts | 385/135 |
| 5,545,854 A * | 8/1996 | Ishida | 174/153 G |
| 5,567,916 A * | 10/1996 | Napiorkowski et al. | 174/153 G |
| 5,588,856 A | 12/1996 | Collins et al. | 439/204 |
| 5,732,180 A * | 3/1998 | Kaplan | 385/135 |

(Continued)

FOREIGN PATENT DOCUMENTS

| | | | |
|---|---|---|---|
| DE | 69121576 T2 | 2/1997 | H02G 15/013 |
| DE | 69600894 T2 | 5/1999 | H01R 13/52 |

(Continued)

*Primary Examiner* — Vishal Patel
*Assistant Examiner* — Eugene G Byrd

(57) ABSTRACT

A sealing body for a cable sleeve for an optical fiber cable is disclosed. The sealing body has a central, cylindrical sealing body segment. The central, cylindrical sealing body segment has, on an outer casing surface, a plurality of cutouts distributed over the circumference thereof, in each case one cylinder-segment-like sealing body segment being capable of being inserted into each of the cutouts of the central sealing body segment, and in each case one cable insertion opening for receiving and individually sealing off in each case one single cable being formed between the central sealing body segment and each cylinder-segment-like sealing body segment. Each of the cylinder-segment-like sealing body segments has a gel-like sealing element, which can be compressed individually independently of the sealing elements of other cylinder-segment-like sealing body segments in order to individually seal off the cable inserted into the respective cable insertion opening.

27 Claims, 3 Drawing Sheets

(56) References Cited

U.S. PATENT DOCUMENTS

| | | | |
|---|---|---|---|
| 5,775,702 A | 7/1998 | Laeremans et al. | 277/314 |
| 5,789,707 A | 8/1998 | Damm et al. | 174/65 |
| 5,825,961 A * | 10/1998 | Wilkins et al. | 385/135 |
| 5,835,658 A * | 11/1998 | Smith | 385/136 |
| 6,248,953 B1 * | 6/2001 | Miller | 174/74 R |
| 6,628,880 B2 * | 9/2003 | Roberts | 385/135 |
| 6,721,483 B2 | 4/2004 | Grubish et al. | 385/135 |
| 6,802,512 B2 * | 10/2004 | Muller et al. | 277/607 |
| 7,015,394 B2 * | 3/2006 | Desard et al. | 174/100 |
| 7,038,137 B2 | 5/2006 | Grubish et al. | 174/93 |
| 2004/0080119 A1 * | 4/2004 | Goll | 277/607 |
| 2004/0256138 A1 | 12/2004 | Grubish et al. | 174/93 |
| 2005/0167431 A1 | 8/2005 | Stora | 220/359.1 |

FOREIGN PATENT DOCUMENTS

| | | | |
|---|---|---|---|
| EP | 0442941 B1 | 1/1995 | H02G 15/18 |
| EP | 0646294 B1 | 11/1996 | H02G 15/00 |
| EP | 1238451 B1 | 5/2003 | H02G 15/00 |
| FR | 2820555 | 8/2002 | H02G 15/013 |
| JP | 11-98671 | 4/1999 | H02G 15/013 |
| JP | 11-313427 | 11/1999 | H02G 3/08 |
| WO | WO93/26069 | 12/1993 | H02G 15/00 |
| WO | WO96/09670 | 3/1996 | H02G 15/013 |
| WO | WO96/29760 | 9/1996 | H01R 4/70 |
| WO | WO97/42693 | 11/1997 | H02G 15/013 |
| WO | WO00/46895 | 8/2000 | H02G 15/013 |
| WO | WO02/063736 | 8/2002 | H02G 15/013 |

* cited by examiner

SEALING BODY FOR A CABLE SLEEVE

CROSS-REFERENCE TO RELATED APPLICATIONS

This application is a continuation of International Application No. PCT/EP2007/001840, filed Mar. 3, 2007, which claims priority to German Application No. DE202006006019.7, filed Apr. 11, 2006, both applications being incorporated herein by reference.

BACKGROUND

1. Technical Field

The invention relates to optical fiber devices, and more particularly to a sealing body for a cable sleeve for fiber optic cable.

2. Technical Background

Cable sleeves for the structured laying and handling of optical waveguides guided in fiber optic cables are used in fiber optic cable networks for protecting spliced joints at junctions between two fiber optic cables and for protecting the optical waveguides at branch junctions or splitting junctions of fiber optic cables. In this case, the cable sleeves must ensure the continuity of the fiber optic cables as though the fiber optic cables were not interrupted. The structured laying and gentle handling of the optical waveguides plays a decisive role here in ensuring that the transmission properties of the optical waveguides are not adversely affected.

EP 0 646 294 B1 has disclosed a cable sleeve which has a covering body and a sealing body, which can be inserted into an opening of the covering body, the sealing body comprising a gel-like sealing material, which is arranged between two dimensionally stable plates. The sealing body is capable of being displaced inwards and outwards in the axial direction with respect to the covering body in a cavity in order to compensate for pressure differences between an internal pressure and an external pressure of the cable sleeve. Depending on this pressure difference, in the process the sealing body comes to bear against different stops.

EP 1 238 451 B1 has disclosed a sealing body for a cable sleeve which is formed by a plurality of sealing body segments. The sealing body segments can be connected to one another via connecting elements in the form of latching elements, a plurality of cable insertion openings being formed between adjoining sealing body segments. In the region of the cable insertion openings, gel-like sealing elements are arranged which can be pressed against cables which can be inserted into the cable insertion openings so as to seal off the cable insertion openings. In accordance with EP 1 238 451 B1, in each case two cable insertion openings are formed between adjoining sealing body segments, which cable insertion openings are jointly sealed off via common gel-like sealing elements.

SUMMARY OF THE DETAILED DESCRIPTION

Against this background, embodiments disclosed in the detailed description are based on the problem of providing a novel sealing body for a cable sleeve. In this regard, the sealing body has a central, cylindrical sealing body segment. The central, cylindrical sealing body segment has, on an outer casing surface, a plurality of cutouts distributed over the circumference thereof, in each case one cylinder-segment-like sealing body segment being capable of being inserted into each of the cutouts of the central sealing body segment, and in each case one cable insertion opening for receiving and individually sealing off in each case one single cable being formed between the central sealing body segment and each cylinder-segment-like sealing body segment.

In the sealing body, in each case one cable insertion opening, which is used for individually sealing off in each case one single cable, is formed between adjoining sealing body segments, namely between the central sealing body segment and each cylinder-segment-like sealing body segment which can be inserted into a cutout of the central sealing body segment.

Accordingly, in each case one cable can be individually sealed off between the central sealing body segment and each cylinder-segment-like sealing body segment, as a result of which different cable diameters can ideally be taken into consideration when said cables are sealed off. A further advantage consists in the fact that, when a cable is intended to be newly sealed off in the region of a cutout of the central sealing body segment and therefore in the region of a cable insertion opening, access only needs to be gained to the corresponding cylinder-segment-like sealing body segment of this cable insertion opening. The other cylinder-segment-like sealing body segments and therefore the other cable insertion openings remain uninfluenced, with the result that seals of other cables are not impaired.

Each cylinder-segment-like sealing body segment has a gel-like sealing element, which can be compressed individually independently of the gel-like sealing elements of other cylinder-segment-like sealing body segments in order to individually seal off the cable which can be inserted into the respective cable insertion opening. An individual pressure element is associated with each cylinder-segment-like sealing body segment in order to individually compress the respective gel-like sealing element. In this case, the gel-like sealing element of each cylinder-segment-like sealing body segment preferably interacts with in each case one gel-like sealing element of the central sealing body segment, which is arranged in the region of the respective cutout of the central sealing body segment.

BRIEF DESCRIPTION OF THE FIGURES

Exemplary embodiments of the invention, without the invention being restricted to these embodiments, are explained in more detail with reference to the drawing, in which.

DETAILED DESCRIPTION

Figure 1:
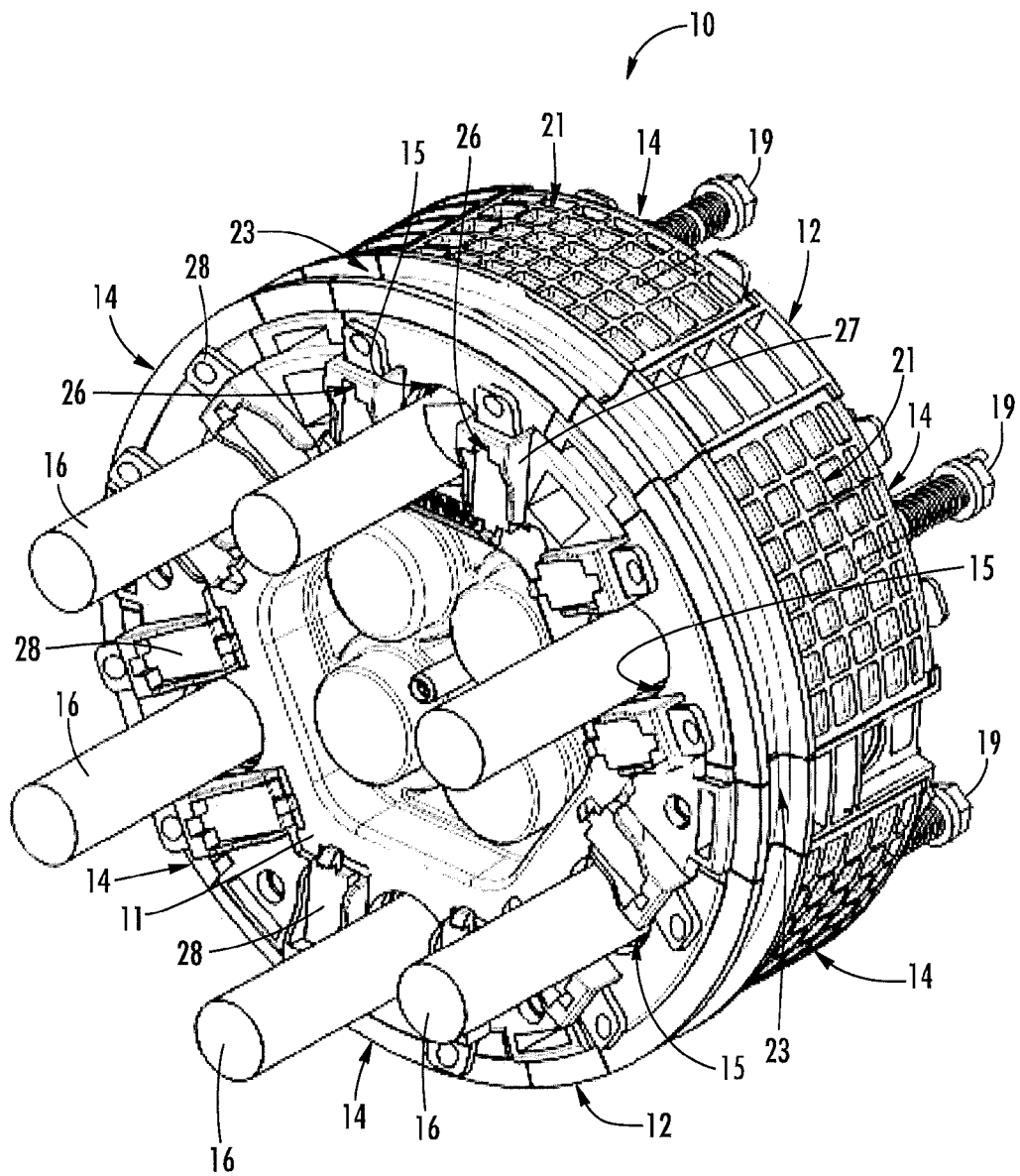
FIG. 1 shows a sealing body according to the invention for a cable sleeve in a perspective view.

The present invention will be described in greater detail below with reference to FIGS. 1 to 3, with FIG. 1 showing an exemplary embodiment of a sealing body 10 according to the invention in the assembled state.

The sealing body 10 according to the invention has a central, cylindrical sealing body segment 11, which has, on an outer casing surface 12, a plurality of cutouts 13. A housing of the central, cylindrical sealing body segment 11 is dimensionally stable. In each case one cylinder-segment-like sealing body segment 14 can be inserted into each of the cutouts 13 of the central sealing body segment 11, in each case one cable insertion opening 15 for receiving in each case one single cable 16 being formed between the central sealing body segment and each cylinder-segment-like sealing body segment 14. In the region of each of the cable insertion openings 15, the cable 16 received by the respective cable insertion opening 15 can be individually sealed off.

In the exemplary embodiment shown, in total six cutouts 13 for receiving in each case one cylinder-segment-like sealing body segment 14 are formed over the circumference of the central sealing body segment 11, the cutouts 13 being positioned so as to be evenly distributed over the circumference of the central sealing body segment 11. Accordingly, the sealing body 10 shown has six cable insertion openings 15, which can be sealed off individually, for individually sealing off in each case one cable 16.

It is noted that the number of cable insertion openings which can be sealed off individually is merely by way of example. A sealing body according to the invention may of course also have, in the region of the central sealing body segment, fewer than six or more than six cutouts for receiving in each case one cylinder-segment-like sealing body segment.

Each cylinder-segment-like sealing body segment 14 (see in particular FIG. 3) has a gel-like sealing element 17, which is arranged between two so-called spring disks 18. The gel-like sealing element 17 of each cylinder-segment-like sealing body segment 14 has a groove-like cutout 30, into which a cable 16 to be sealed off can be inserted.

In the exemplary embodiment shown, a force or a pressure can be exerted on one of the spring disks 18 via a pressure element 19, which, in the exemplary embodiment shown, is in the form of an adjusting screw, via which force or pressure the gel-like sealing element 17 can ultimately be deformed or compressed. That is to say that the spring disk 18 on which the pressure element 19 acts is capable of being moved by means of the pressure element 19 relative to the other spring disk 18 in order thus to adjust the force acting on the gel-like sealing element 17 or the pressure acting on the gel-like sealing element 17. Each cylinder-segment-like sealing body segment 14 has a separate pressure element 19 for individually compressing the respective gel-like sealing element 17.

Spring elements 20, which protrude inwards into the groove-like cutout 30 of the gel-like sealing element 17, of the spring disks 18 firstly center a cable 16 to be sealed off and secondly prevent the gel-like sealing element 17 from being capable of flowing out of the respective cable insertion opening 15.

Preferably, gel-like sealing elements 29 (see FIG. 2) are likewise positioned in the region of the cutouts 13 of the central sealing body segment 11, which sealing elements 29 interact with the corresponding gel-like sealing element 17 of the cylinder-segment-like sealing body segment 14 to be inserted into the cutout 13. The gel-like sealing elements 29 of the central sealing body segment 11 also each have a groove-like cutout, which ultimately, together with the groove-like cutouts of the gel-like sealing element 17 of the cylinder-segment-like sealing body segments 14, define the cable insertion openings 15.

The gel-like sealing elements 29 of the central sealing body segment 11 interact with the gel-like sealing elements 17 of the cylinder-segment-like sealing body segments 14 in such a way that, when a gel-like sealing element 17 of a cylinder-segment-like sealing body segment 14 is compressed via the pressure element 19 thereof, the gel-like sealing element 29 interacting with this gel-like sealing element 17 is also compressed, with projections of a spring disk (not shown), which delimit this sealing element 29, engaging in cutouts 31 of a spring disk 18, which delimits the gel-like sealing element 17, for this purpose. In this way, by means of the compression of a gel-like sealing element 17 of a cylinder-segment-like sealing body segment 14 with the aid of the pressure element 19 of this cylinder-segment-like sealing body segment 14, the gel-like sealing element 29 interacting with this gel-like sealing element 17 can also be compressed indirectly.

Figure 3:
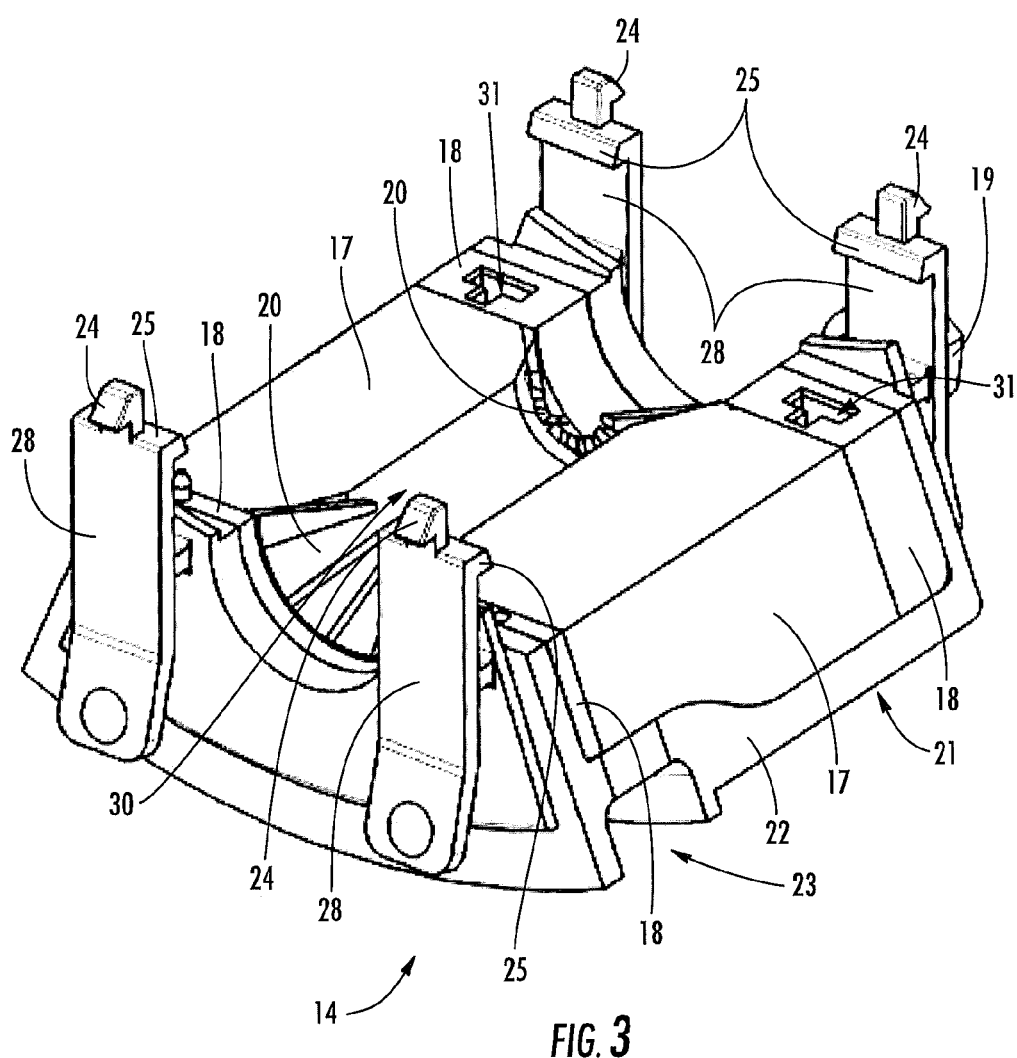
FIG. 3 shows a cylinder-segment-like sealing body segment of the sealing body according to the invention illustrated on its own in a perspective view.

As shown in FIG. 3, the gel-like sealing element 17, which is delimited by the spring disks 18 on two opposite sides, of each cylinder-segment-like sealing body segment 14 is arranged together with the spring disks 18 in a housing 22 of the cylinder-segment-like sealing body segment 14. The housing 22 of each cylinder-segment-like sealing body segment 14 delimits a radially outer surface 21 thereof and is dimensionally stable in the same way as the housing of the central sealing body segment.

When, as shown in FIG. 1, the sealing body 10 according to the invention is assembled and thus the cylinder-segment-like sealing body segments 14 have been completely inserted into the cutouts 13 of the central sealing body segment 11, the surfaces 21 of the housing 22 of the cylinder-segment-like sealing body segments 14 complement the casing surface 12, which is interrupted by the cutouts 13, of the central sealing body segment 11 and therefore the housing thereof.

As shown in FIG. 1, groove-like cutouts are introduced both into the outer surface 21 of the housing 22 of the cylinder-segment-like sealing body segments 14 and into the casing surface 12 of the central sealing body segment 11, which cutouts complement one another in the assembled state of the sealing body 10 illustrated in FIG. 1 so as to form a groove-like cutout 23 running around the periphery in the circumferential direction, into which cutout 23 a sealing body (not illustrated) can be inserted so as to seal off the sealing body 10 according to the invention with respect to a covering body (likewise not illustrated).

Figure 2:
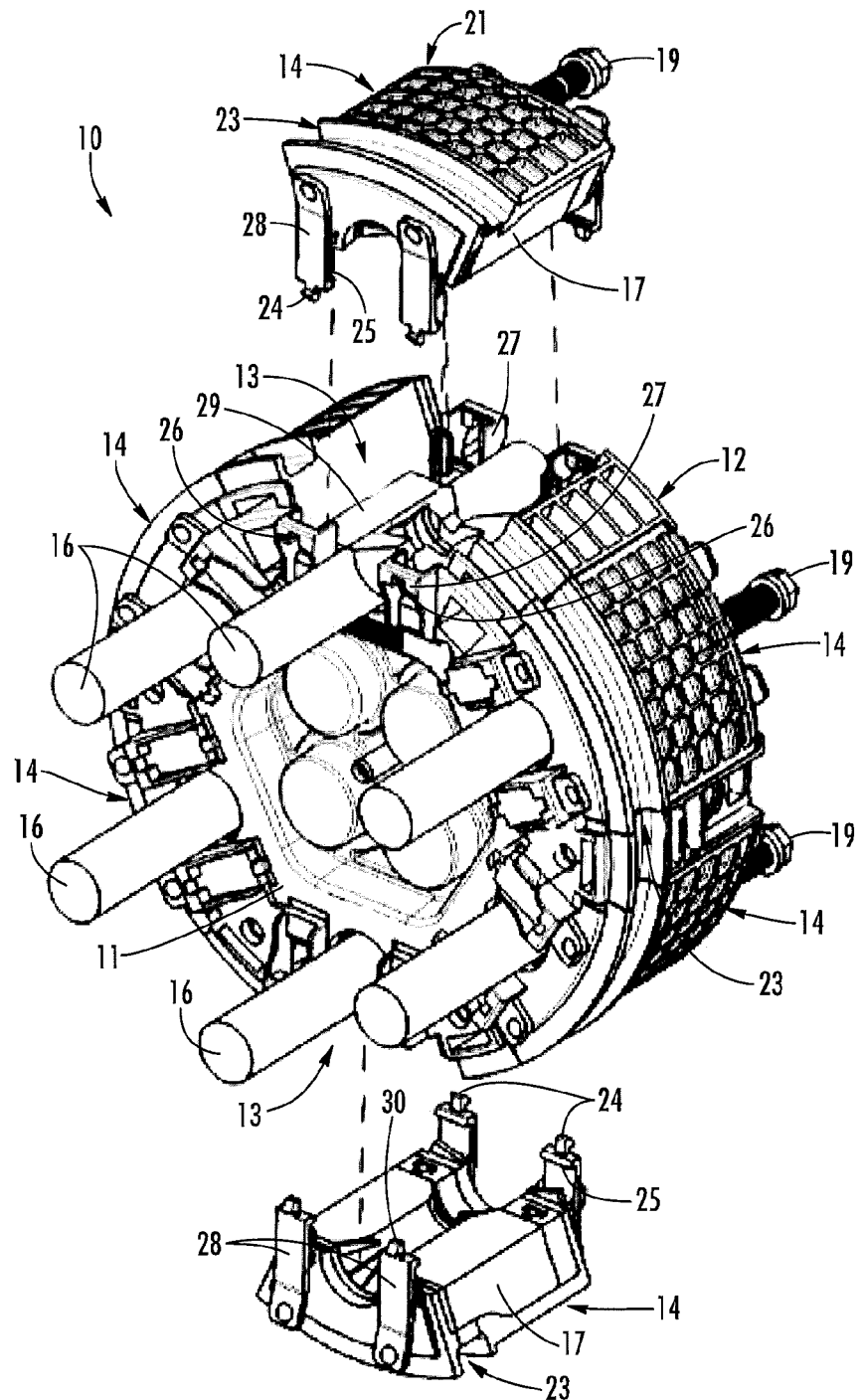
FIG. 2 shows the sealing body according to the invention shown in FIG. 1 in a partial perspective exploded view.

As can be seen in particular in FIG. 2, the cylinder-segment-like sealing body segments 14 can be inserted into the cutouts 13 of the central sealing body segment 11 in the radial direction of the sealing body 10.

When fitting the cylinder-segment-like sealing body segments 14 into the cutouts 13 of the central sealing body segment 11, connecting elements of the cylinder-segment-like sealing body segments 14 in the process interact with connecting elements of the central sealing body segment 11. Thus, in the preferred exemplary embodiment, each cylinder-segment-like sealing body segment 14 has two different connecting elements, namely first connecting elements 24 and second connecting elements 25.

The first connecting elements 24 of each cylinder-segment-like sealing body segment 14 are in this case preferably in the form of latching tabs or snap-action hooks, which interact with correspondingly contoured cutouts 26 of connecting elements 27 of the central sealing body segment 11 in such a way that the cylinder-segment-like sealing body segments 14 can be prefitted on the central sealing body segment 11 in such a way that they cannot become detached in the region of the cutouts 13. In this case, the first connecting elements 24 of the cylinder-segment-like sealing body 14 delimit, together with the cutouts 26 of the connecting elements 27 of the central sealing body segment 11, the radial displaceability of the cylinder-segment-like sealing body segments 14 with respect to the central sealing body segment 11 radially outwards.

When the cylinder-segment-like sealing body segments 14 are adjusted to a maximum extent radially outwards with respect to the central sealing body segment 11, the first connecting elements 24 of the cylinder-segment-like sealing body segments 14 engage in the cutouts 26 of the connecting elements 27 of the central sealing body segment 11 and facilitate the insertion of a cable 16 into the corresponding cable insertion opening 15.

Once a cable 16 has been inserted into the cable insertion opening 15, the corresponding cylinder-segment-like sealing body segment 14 is then capable of being displaced radially inwards, in which case the second connecting elements 25, which are likewise preferably in the form of latching tabs or snap-action hooks, engage in correspondingly contoured recesses of the connecting elements 27 of the central sealing body segment 11 so as to fix the cylinder-segment-like sealing body segment 14 in the respective cutout 13 of the central sealing body segment 11. These recesses are not illustrated in FIGS. 1 and 2, but are offset radially inwards with respect to the cutouts 26 of the connecting elements 27.

In the exemplary embodiment shown, each cylinder-segment-like sealing body segment 14 has in total four first connecting elements 24 and four second connecting elements 25, which are formed on four webs 28, which extend in the radial direction and act on the housing 22. In this case, a first connecting element 24 and a second connecting element 25 are formed on each of the webs 28 and each point or act in opposite directions on the corresponding webs 28.

The sealing body 11 according to the invention thus has a central, cylindrical sealing body segment 11 and a plurality of cylinder-segment-like sealing body segments 14, which can be inserted into cutouts 13 of the central sealing body segment 11 in the radial direction. In this case, a cable insertion opening 15, which is used for receiving and individually sealing off a single cable 16, is formed between each cylinder-segment-like sealing body segment 14 and the central sealing body segment 11.

Each cylinder-segment-like sealing body segment 14 has a gel-like sealing element 17, which can be individually compressed or deformed. Pressure elements 19 associated with the cylinder-segment-like sealing body segments 14 are used for this purpose, via which pressure elements 19 an individual force or an individual pressure can be exerted on the gel-like sealing elements 17 of each cylinder-segment-like sealing body segment 14 so as to individually deform the latter. Gel-like sealing elements 29 arranged in the cutouts 13 of the central sealing body segment 11 interact with the gel-like sealing elements 17 of the cylinder-segment-like sealing body segments 14. These gel-like sealing elements 29 can be compressed indirectly via the pressure elements 19 of the cylinder-segment-like sealing body segments 14.

The connecting elements 24 and 25 of the cylinder-segment-like sealing body segments 14 make it possible for the latter to be fitted in a simple manner on the central sealing body segment 11, first connecting elements 24 being used for prefitting the cylinder-segment-like sealing body segments 14 on the central sealing body segment 11 in such a way that they cannot become detached, and second connecting elements 25 fixing the cylinder-segment-like sealing body segments 14 in the final assembled position on the central sealing body segment 11.

A significant advantage of the sealing body 10 according to the invention consists, inter alia, in the fact that all of the cables can be sealed off individually. If, for example, the seal of a cable 16 is intended to be changed in the region of a cylinder-segment-like sealing body segment 14 or a cable 16 is intended to be inserted for the first time into the corresponding cable insertion opening 15, the seals of other cables in the region of other cylinder-segment-like sealing body segments 14 do not need to be detached for this purpose. As a result, the complexity involved for sealing off a cable 16 can be markedly reduced.

What is claimed is:

1. A sealing body for a cable sleeve for an optical fiber cable, comprising:
   a central cylindrical sealing body segment having an outer casing surface with at least six cutouts distributed over the circumference thereof, wherein each of the at least six cutouts are defined between substantially radially-extending surfaces of the central cylindrical sealing body segment;
   a cylinder-segment-like sealing body segment capable of being inserted into each one of the plurality of cutouts of the central sealing body segment, wherein the cylinder-segment-like sealing body segment is insertable into any one of the at least six cutouts of the central sealing body segment in a radial direction of the central sealing body segment; and
   a single cable insertion opening for receiving and sealing off one cable, formed between the central cylindrical sealing body segment and each cylinder-segment-like sealing body segment,
   wherein each of the cylinder-segment-like sealing body segment has a gel-like sealing element, which can be compressed individually independently of the sealing elements of other cylinder-segment-like sealing body segments in order to individually seal off the cable inserted into the respective cable insertion opening.

2. The sealing body of claim 1, wherein the cylinder-segment-like sealing body segment comprises a first cylinder-segment connecting element, and wherein the central sealing body segment comprises at least one central sealing body connecting element, and wherein the cylinder-segment connecting element interacts with one of the at least on central sealing body connecting element.

3. The sealing body of claim 2, wherein the first cylinder-segment connecting element is in the form of a latching tab or snap-action hook, which engages in a correspondingly contoured cutout or recesses of the one of the at least one central sealing body connecting element, wherein the cylinder-segment-like sealing body segment is capable of being prefitted on the central sealing body segment via the first cylinder-segment connecting element in such a way that the cylinder-segment-like sealing body segment cannot become detached and in such a way that cylinder-segment-like sealing body segment is capable of being moved relative to the central sealing body segment in order to facilitate the insertion of a cable into the cable insertion opening.

4. The sealing body as claimed in claim 2, wherein the cylinder-segment-like sealing body segment further comprises a second cylinder-segment connecting element wherein the second cylinder-segment connecting element is in the form of a latching tab or snap-action hook, which engages in correspondingly contoured cutouts or recesses of another one of the at least one central sealing body connecting element connecting elements, wherein the cylinder-segment-like sealing body segment is capable of being fitted on the central sealing body segment via the second cylinder-segment connecting element in such a way that a final assembled position, in particular the radial position, thereof is fixed relative to the central sealing body segment.

5. The sealing body of claim 1, wherein the gel-like sealing element of the cylinder-segment-like sealing body segment can be individually compressed via an individual pressure element.

6. The sealing body of claim 5, characterized in that the central sealing body segment has, in the region of each cutout, a gel-like sealing element, which interacts with the gel-like sealing element of the corresponding cylinder-segment-like sealing body segment.

7. The sealing body of claim 1, wherein the plurality of cutouts of the central sealing body segment, which are used for receiving in each case one cylinder-segment-like sealing body segment and individually sealing off in each case one cable, are arranged evenly distributed over the circumference of the central sealing body segment.

8. The sealing body of claim 1, wherein an outer surface of the cylinder-segment-like sealing body segments complements the casing surface, which is interrupted by the plurality of cutouts, of the central sealing body segment in a final assembled position.

9. The sealing body of claim 8, further comprising groove-like cutouts introduced into the outer surface of the cylinder-segment-like sealing body segments and into the casing surface of the central sealing body segment, which groove-like cutouts complement one another in the final assembled position and into which a sealing element can be inserted in order to seal off the sealing body with respect to a covering body of a cable sleeve.

10. A sealing body for a cable sleeve for an optical fiber cable, comprising:
a central sealing body segment, the central sealing body segment having an outer casing surface with a plurality of cutouts distributed over the periphery of the outer casing surface, wherein each of the plurality of cutouts are defined between substantially radially-extending surfaces of the central cylindrical sealing body segment;
at least one sealing body segment, the at least one sealing body segment having at least one sealing element, the at least one sealing body segment being insertable into any one of the plurality of cutouts of the central sealing body segment, and
at least one cable insertion opening formed between the central sealing body segment and the at least one sealing body segment for respectively receiving and sealing at least one optical fiber cable, there being a single cable insertion opening for at least one sealing body segment so that the associated optical fiber cable is configured to be received and sealed independently of any other optical fiber cables inserted into any other cable insertion openings formed between the central sealing body segment and any other sealing body segments.

11. The sealing body of claim 10, the at least one sealing body segment being radially insertable into the at least one cutout of the central sealing body.

12. The sealing body of claim 10, the sealing body segment including at least one first segment connecting element.

13. The sealing body of claim 12, the central sealing body segment including at least one central sealing body connecting element, the at least one central sealing body connecting element capable of interacting with one of the at least one first segment connecting element for sealing the at least one optical fiber cable.

14. The sealing body of claim 13, the first segment connecting element being in the form of a latching tab or snap-action hook, which engages a correspondingly contoured cutout or recess of one of the at least one central sealing body connecting element, the at least one sealing body segment capable of movement, after the engagement, relative to the central sealing body segment to facilitate the insertion of the at least one optical fiber cable into the at least one cable insertion opening.

15. The sealing body of claim 13, the sealing body segment further including at least one second segment connecting element, the second segment connecting element being in the form of a latching tab or snap-action hook, which engages a correspondingly contoured cutout or recess of one of the at least one central sealing body connecting element, the at least one sealing body segment being at least radially fixed relative to the central sealing body segment in a final assembled position via the at least one second segment connecting element.

16. The sealing body of claim 10, the at least one sealing element of the sealing body segment being compressed via an individual pressure element, independently of any other sealing element of any other sealing body segment.

17. The sealing body of claim 16, the central sealing body segment including at least one central sealing body sealing element in the region of each cutout, at least one central sealing body sealing element capable of interacting with the at least one sealing element of the corresponding sealing body segment.

18. The sealing body of claim 17, the sealing elements being gel-like sealing elements.

19. The sealing body of claim 10, the plurality of cutouts of the central sealing body segment being arranged evenly distributed about the periphery of the central sealing body segment.

20. The sealing body of claim 10, the at least one sealing body segment including an outer surface that complements the outer casing surface of the central sealing body segment in a final assembled position, the outer casing surface generally being interrupted by the plurality of cutouts in an unassembled position.

21. The sealing body of claim 20, further including groove-like cutouts introduced into the outer surface of the sealing body segments and into the outer casing surface of the central sealing body segment, the groove-like cutouts complement one another in the final assembled position and into which another sealing element can be inserted in order to seal the sealing body with respect to a covering body of a cable sleeve.

22. The sealing body of claim 10, the central sealing body segment having a generally cylindrical shape.

23. The sealing body of claim 10, the at least one sealing body segment having a generally cylinder-segment-like shape.

24. A sealing body for a cable sleeve for an optical fiber cable, comprising:
a central sealing body segment, the central sealing body segment having an outer casing surface with a plurality of cutouts distributed over the outer casing surface, wherein each of the plurality of cutouts are defined between substantially radially-extending surfaces of the central cylindrical sealing body segment;
at least one sealing body segment, the at least one sealing body segment being radially insertable into any one of the plurality of cutouts;
at least one sealing element, the at least one sealing element at least partially disposed on the central sealing body segment, the at least one sealing element being associated with the at least one sealing body segment, the at least one sealing element adapted to receive a respective optical fiber cable, and the at least one sealing element being a generally compressible gel-like sealing element; and
at least one cable insertion opening, formed between the central sealing body segment and the at least one sealing body segment, the at least one cable insertion opening being associated with the at least one sealing element for inserting and sealing the associated optical fiber cable, the at least one sealing element being engaged and disengaged by the at least one sealing body segment, there being a single cable insertion opening for at least one sealing body segment so that the associated optical fiber cable is configured to be received and sealed independently of any other optical fiber cables inserted into any other cable insertion openings formed between the central sealing body segment and any other sealing body segments.

25. The sealing body of claim 24, the sealing body including at least one pressure element, the at least one pressure element cooperating with the at least one sealing body segment for engaging and disengaging the at least one sealing element, for compressing the at least one sealing element.

26. The sealing body of claim 24, the at least one sealing element including at least one cutout for receiving the at least one optical fiber cable.

27. The sealing body of claim 24, the plurality of cutouts being distributed along the periphery of the outer casing surface.

* * * * *